United States Patent Office

2,875,132
Patented Feb. 24, 1959

2,875,132

OXYGENATION OF STEROIDS IN THE 11, 17 AND 21 POSITIONS BY MIXED CULTURES

William McAleer, Elizabeth, and Eugene L. Dulaney, Rahway, N. J., assignors to Merck & Co., Inc., Rahway, N. J., a corporation of New Jersey No Drawing. Application December 4, 1953
Serial No. 396,319

8 Claims. (Cl. 195—51)

This invention relates to processes for introducing oxygen substituents into a steroid molecule and particularly to processes for preparing oxygenated steroids by subjecting desoxy steroids to the action of oxygenating strains of microorganisms or their oxygenating enzymes.

The discovery of the remarkable therapeutic properties of cortisone, hydrocortisone and related compounds has stimulated wide interest in finding simpler and more economical methods of preparing such compounds. Heretofore, these compounds were primarily produced through highly involved synthesis necessitating a considerable number of separate steps, the number required necessarily depending upon the starting material. As an example, a typical synthesis of hydrocortisone from relatively inexpensive desoxycholic acids involves approximately forty separate reactions. The most difficult steps in the synthesis of these compounds is the introduction of oxygen substituents at various positions of the steroid molecule, particularly at the 11, 17 and 21 carbon atoms. Because of the difficulty in introducing these oxygen substituents, proper selection of the starting material and the sequence and number of operations are important factors. The selection of the starting material requires a proper balance between cost and ease of oxygenation, which necessitates extensive research to determine which are the most promising.

The oxygenation of steroids by fermentation procedures through the action of particular oxygenating strains of microorganisms or their oxygenating enzymes has been recently proposed. For example, the U. S. Patent No. 2,602,769, issued to Herbert C. Murray and Durey H. Peterson on July 8, 1952, discloses the use of oxygenating fungus of the order Mucorales and particularly of the families Mucoraceae and Choanephoraceae for producing primarily 11-oxygenated steroids. This patent also discloses the preparation of compounds oxygenated at the 6 or 8 position as well as mixtures of various other oxygenated products. The U. S. Patents No. 2,649,400, issued to Murray and Peterson, No. 2,649,401, issued to William J. Haines and Donald R. Colingsworth, and No. 2,649,402, issued to Murray and Peterson, all on August 18, 1953, disclose the use of oxygenating strains of the genera Pencillium, Streptomyces and Aspergillus for oxygenating the 11 position of steroids. Although the processes disclosed in most of these patents are utilized primarily for the production of 11-oxygenated steroids certain of them disclose processes for the preparation of products having other oxygenated positions. The aforementioned Patent No. 2,602,769 discloses the formation of products having more than one position oxygenated. The processes disclosed in the latter patent for preparing the desired multi-oxygenated products (i. e., products which have undergone oxygenation at two or more positions of the steroid molecule), however, results in the formation of a multiplicity of other undesired oxygenated products including mixtures of stereoisomers and position isomers, rather than an appreciable amount of a single product. The yields of the individual desired products are very low, and, because of the different types of mixtures obtained, extremely complicated extraction procedures are required to separate them from each other. It is apparent, therefore, that it is not feasible to prepare multi-oxygenated steroids in commercial amounts by these processes.

The desirability of being able to produce a multi-oxygenated steroid in good yield, and particularly one that has the particular positions oxygenated that are necessary for forming valuable hormones, by fermentation procedures, is readily apparent. Such a method would enable the elimination of many complex steps that were heretofore found necessary in order to produce the hormonally active steroids; and, possibly more important, it would eliminate the necessity for careful selection of the starting material, thus making possible the utilization for this purpose inexpensive materials hitherto considered impractical for hormone production.

A primary object of the present invention is to produce oxygenated steroids by a process not subject to the difficulties encountered in the process previously available. A related object is to produce multi-oxygenated steroids by a fermentation process in economical feasible yields without the formation of undesirable side-products. A further object is to provide, by simple and effective processes, direct oxygenation of the 11, 17 and 21 carbon atoms of steroids using fermentation procedures. Other objects and the advantages of this invention will appear hereinafter.

In accordance with the present invention the multi-oxygenation of steroids is conveniently effected in a single fermentation operation by subjecting steroids to the action of oxygenating strains of each of the genera Spondylocladium, Trichoderma and Wojnowicia and particularly to the species *Wojnowicia graminis* (NRRL 2472), *Trichoderma viride* (NRRL 2473) and *Curvularia lunata* NRRL 2434) of these genera or to oxygenating enzymes produced by these microorganisms which will each individually selectively oxygenate in primarily one distinct position of the steroid molecule. The microorganism *Curvularia lunata* (NRRL 2434) may also be considered a species of Spondylocladium. The species *Wojnowicia graminis* (NRRL 2472) will introduce a hydroxy group at the 21 carbon atom of the steroid molecule. The species *Trichoderma veride* (NRRL 2473) will introduce a hydroxy group at the 17 carbon atom in the alpha configuration. The species *Curvularia lunata* (NRRL 2434) will introduce a hydroxy group at the 11 carbon atom in the beta configuration. Thus, in accordance with this invention 4-pregnene-3,20-dione (progesterone) may be converted directly to 4-pregnene-11$\beta$,17$\alpha$,21-triol-3,20-dione (hydrocortisone) by fermentation procedures.

A feature of this process is that it provides means for oxygenating two or more positions of a steroid molecule without the formation also of a large number of unwanted oxygenated products, such as stereoisomers and position isomers which result in low yields of the desired products and requires complicated extraction procedures to separate them from the unwanted products. The ability of the process in accordance with the invention to produce desired multi-oxygenated steroids in good yield is a new and unexpected result, since it would be expected that the different microorganisms used in the same process would interfere with each other and thereby result in low yields of the desired products either through one or more organisms poisoning the other or by other interaction resulting in the disintegration of the organisms. Quite to the contrary, however, it is found that by the use of distinct microorganisms for the oxygenation of the various carbon atoms, it is possible to maintain rigid control over the oxygenation of the steroid with a resulting high yield of desired multi-oxygenated product. The ability to control the multi-oxygenation is very important, since this control was heretofore impossible by prior methods of multi-oxygenation.

In accordance with this invention, the multi-oxygenation may take place with only one fermentation operation, thereby eliminating the necessity of separating the components after each oxygenation period as would be necessary if each oxygenation step was performed singly. This is an advantage since it greatly increases the yield over what could be obtained in separate fermentation operations, and since in the latter case there is always a significant portion of the desired oxygenated steroid lost through the recovery procedure used for separating the desired product from the fermentation broths. In the processes in accordance with this invention, it has been found that the loss due to the recovery procedure is substantially reduced; for example, if two carbon atoms are oxygenated, the loss is reduced approximately 50% and for oxygenations of three of the carbons, the loss is reduced approximately 67%. Because of the high cost of the compounds produced, any reduction in recovery loss has a considerable economic value. This particular characteristic of the processes of this invention is also particularly advantageous since the decrease in recovery loss results in a gain in yield of the desired product and enables the use of strains of microorganism which although slightly less effective, from the standpoint of oxygenation are more desirable for other reasons, such as nutritional requirements, stability and availability.

The method of carrying out the processes of the invention is not critical. The strains of the microorganism may all be added at once, or the addition may be continuous or spasmodic during the fermenting period. In like manner, only one of the microorganisms may be added at the start of, or continuously or spasmodically during the fermentation period, and at the end of the period or during the fermentation cycle the next microorganism may be added in any suitable manner. Also any combination of these two procedures may be used.

One of the most unusual and an unexpected feature of this invention is that the order of the introduction of the various microorganisms for oxygenating the various positions of the steroid is not critical. The oxygenation of the various positions may take place in any desired order by merely arranging the order of addition of the particular microorganisms with the desired order of oxygenation. It would be expected that use of certain microorganism of the adaptive type, because of undesirable adaptation, would lead to the formation of undesirable oxygenated steroids or the presence of certain groups would inhibit oxygenation.

The species *Wojnowicia graminis* (NRRL 2472) is of the order Sphaeropsidales, family Sphaeroidaceae (Phomacea) and the genus Wojnowicia. The species *Trichoderma viride* (NRRL 2473) is of the order Moniliales, family Moniliaceae and the genus Trichoderma. The species *Curvularia lunata* (NRRL 2434) is of the order Moniliales, family Dematiaceae and the genus Spondylocladium (Curvularia).

These microorganisms can be obtained from known sources, such as the Northern Regional Research Laboratories, Peoria, Illinois, American Type Culture Collection, Washington, D. C., or Centraalbureau voor Schimmelculture, Baarn, Holland. Alternatively, they may be obtained from natural sources using techniques known to microbiologists.

In carrying out the process of this invention, the steroid to be oxygenated is subjected to the action of oxygenating enzymes produced by growing oxygenating strains of fungi. This is conveniently accomplished by growing the microorganisms under aerobic conditions in a suitable nutrient medium in intimate contact with the steroid to be oxygenated; the culturing growth of the microorganism being continued until the desired oxygenation has occurred. Alternatively the process may be effected by the use of homogenized resting cells by first growing the microorganism in a suitable fermentation medium under aerobic conditions, separating the cells from the fermentation medium and adding the steroid to these resting cells and continuing the aerobic conditions for a sufficient time to effect the desired oxygenation.

The steroid can be added to the nutrient medium as a suspension in a suitable solvent, such as water; as a solution in a solvent, such as acetone, proplyene glycol, dimethylformamide or dimethylacetamide; or in a finely divided form, such as a solid micronized powder. In general, it is desirable that the steroid be present in very finely divided form in order to permit maximum contact with the oxygenating culture medium and insure completion of the reaction.

The process of the present invention can be effected in both stationary and submerged cultures of microorganisms growing under aerobic conditions, although, for practical purposes, it is most conveniently carried out by growing the microorganisms under submerged conditions in a suitable aqueous fermentation medium containing the steroid.

It is essential to this invention, however, that a fermentation medium be selected which is suitable for growth of each of the microorganisms, and the conditions under which each will oxygenate effectively must be maintained during its oxygenation period. Since the microorganisms may be oxygenated successively as well as concurrently, it enables careful control of the conditions most favorable for each oxygenating organism.

The use of a combination of microorganism in the processes of this invention makes possible effective use of the nutrient medium, in that the utilization of the medium may be complete; whereas, in other fermentation processes, the utilization of the nutrient medium is incomplete. This factor will tend to reduce operational costs of the process and thereby effect a further economy.

Aqueous nutrient mediums suitable for growing the oxygenating strains of the microorganism must contain sources of assimilable carbon and nitrogen as well as minor amounts of inorganic salts. Any of the usual sources of assimilable carbon, such as dextrose, cerelose, glucose, inverted molasses, and the like, employed in fermentation mediums, can be used in carrying out the process of our invention. Similarly, complex sources of nitrogen usually employed in commercial fermentation processes such as lactalbumin digest ("Edamine") and corn steep liquor; or inorganic sources of nitrogen, such as dibasic ammonium phosphate, ammonium nitrate, and the like, are satisfactory for use in the fermentation media. Minor amounts of other substances, such as nicotainamide or inorganic salts, such as suitable soluble salts of magnesium, zinc, potassium, sodium, phosphorous, and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in our process of oxygenating steroids:

Medium No. 1: G.
    Commercial dextrose (cerelose) _____ 50.00
    Commercial lactalbumin digest (Edamine) _ 20.00
    Corn steep liquor _____ 5.0
    Distilled water is added to give a total volume of 1 liter of nutrient medium and the pH adjusted to 6.5 with sodium hydroxide.

Medium No. 2:
    Inverted black strap molasses _____ 100.0
    Commercial lactalbumin digest (Edamine) __ 20.0
    Corn steep liquor _____ 5.0
    Distilled water is added to give a total volume of 1 liter of nutrient medium and the pH adjusted to 6.5 with sodium hydroxide.

Medium No. 3:
- Inverted black strap molasses _____ 100.0
- Corn steep liquor _____ 5.0
- Distilled water is added to give a total volume of 1 liters of nutrient medium and the pH adjusted to 6.5 with sodium hydroxide.

Medium No. 4:
- Inverted black strap molasses _____ 100.0
- Corn steep liquor _____ 20.0
- Distilled water is added to give a total volume of 1 liter of nutrient medium and the pH adjusted to 6.5 with sodium hydroxide.

Medium No. 5:
- Inverted black strap molasses _____ 50.0
- Corn steep liquor _____ 6.3
- Distilled water is added to give a total volume of 1 liter of nutrient medium and the pH adjusted to 6.5 with sodium hydroxide.

Medium No. 6:
- Dextrose _____ 50.0
- $(NH_4)_2HPO_4$ _____ 7.5
- $K_2HPO_4$ _____ 1.0
- $MgSO_4 \cdot 7H_2O$ _____ 0.5
- KCl _____ 0.5
- $FeSO_4 \cdot 7H_2O$ _____ 0.01
- $ZnSO_4 \cdot 7H_2O$ _____ 0.01
- Distilled water is added to give a total volume of 1 liter of nutrient medium and the pH adjusted to 6.5 with sodium hydroxide.

Medium No. 7:
- Cuban blackstrap inverted molasses _____ 50.0
- Corn steep _____ 5.0
- Distilled water is added to give a total volume of 1 liter of nutrient medium and the pH adjusted to 5.9 with sodium hydroxide.

Medium No. 8:
- Cuban blackstrap inverted molasses _____ 100.0
- Corn steep _____ 5.0
- Distilled water is added to give a total volume of 1 liter of nutrient medium and the pH adjusted to 5.8 with sodium hydroxide.

The addition of minor amounts of anti-foaming agents, although not essential, is desirable with some fermentation media. It has been found that the addition to certain fermentation mediums, of a substituted oxazaline which is a nonvolatile, amine-type, cationic surface active agent, available under the trade name Alkaterge C, is particularly effective in reducing the amount of foam, although other antifoam agents known to be useful for this purpose can also be used.

The utilization of these processes also results in many other savings in operational costs. One such saving, in particular, is the time factor involved with the resulting saving in amount of equipment necessary and the power usage. When using these processes only one fermenter is necessary where heretofore two or more would be required. When carrying out this process, the sterilization of the fermentation medium may be accomplished in one step, thereby affecting a further economy.

The processes of this invention are particularly useful in the oxygenation of 4-pregnene-3,20-dione, a relatively cheap material to 4-pregnene-11β,17α,21-triol-3,20-dione by the introduction of 11β, 17α and 21 hydroxy groups. Other steroids, however, may be oxygenated thereby producing hormones or intermediates in the preparation of hormones. Thus, this process is applicable in general to saturated and unsaturated cyclopentanopolyhydrophenanthrene compounds. Such cyclopentanopolyhydrophenanthrene compounds may be unsubstituted or may contain substituents, such as keto, hydroxyl, acyloxy, halide alkyl, and the like, at various positions of the cyclopentanopolyhydrophenanthrene nucleus. In addition, such compounds may have at the 17-position a keto side chain, a saturated or unsaturated hydrocarbon side chain, a carboxylic acid side chain, and the like. Examples of classes of such cyclopentanopolyhydrophenanthrene compounds that might be mentioned are pregnanes, pregnenes, allopregnanes, allopregnenes, androstanes, bile acids and their esters, sterols, sapogenins, and derivatives thereof. Thus, representative steroids, such as 4-pregnene-3,20-dione; 4-pregnene-17α-ol-3,20-dione; 4-pregnene-17α-ol-3,20-dione-21-acetate; desoxycorticosterone; 4-pregnene-17α,21-diol-3,20-dione; 3-keto-cholanic acid; lithocholic acid; diosgenin; 5,6-dichlorodiosgenin; 4-pregnene-3β-ol-20-one; 5,6-dichloropregnane-3β-ol-20-one; 5,6-dichloropregnane-21-ol-3,20-dione; 4-pregnene-6-ol-3,20-dione; and the like, can be oxygenated at positions 11, 17 and 21 to obtain the corresponding multi-hydroxy derivatives.

For example, an 11, 17, 21-desoxy pregnene can be oxygenated in accordance with the following procedure;

Small amounts of vegetative growth or spore suspension of the species *Wojnowicia graminis* (NRRL 2472), *Trichoderma viride* (NRRL 2473), *Curvularia lunata* (NRRL 2434) are inoculated into separate sterile culture mediums, such as those referred to above. The inoculated nutrient medium containing the species *Wojnowicia graminis* (NRRL 2472) is then incubated at a temperature of about 20 to 45° C., while being agitated in the presence of oxygen for a period of about a few hours to several days. At this point, a solution of an 11,17,21-desoxy pregnene in a solvent such as propylene glycol is added to the fermentation medium and the agitation and aeration of the nutrient medium continued for about 5 to 30 hours, or until the oxygenation reaction is completed. During this fermentation period the second medium containing the species *Trichoderma viride* (NRRL 2473) is incubated at a temperature of about 20 to 45° C., while being agitated in the presence of oxygen for a period of a few hours to several days. This growth is then added to the fermented desoxy pregnene medium and the agitation and aeration of the medium continued for about 5 to 30 hours. The species *Curvularia lunata* (NRRL 2434) which had been similarly incubated is then added and the fermentation continued for about 5 to 30 hours. When this oxygenation is complete, the 11,17,21-trihydroxy pregnene may be recovered from the fermentation broth by extraction with a suitable water immiscible organic solvent. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the oxygenated steroid can then be evaporated to yield the desired product which may be further purified by recrystallization or other procedures conventional in the art.

Alternatively, the process of this invention can be effected by contacting the oxygenating enzymes produced by the fermentation of the microorganisms with the steroid to be oxygenated. This can be accomplished by recovering the oxygenating enzymes from the fermentation broths in accordance with procedures known in the art, and intimately contacting such enzymes with a steroid in an aqueous medium in a manner similar to the above fermentation medium procedure.

The following examples are given for purpose of illustration.

Example 1

Four samples of approximately 50 ml. each of a culture medium having the composition of medium #1 were sterilized for 20 minutes at 120° C. in 250 ml. flasks. Each medium was then inoculated with approximately five milliliters of vegetative growth of culture *Wojnowicia graminis* (NRRL 2472). The inoculated mixtures were then agitated using a rotary shaker at an agitation speed of 220 R. P. M., for approximately 72 hours while maintaining the temperature at 28° C. A sterile solution of 20 mg. of 4-pregnene-3,20-dione in 5 ml. of propylene was added to each flask and the agitation continued at the same rate for approximately 48 hours. At this point 50 ml. of a 3 day old vegetative growth of culture Curvularia lunata (NRRL 2434) in medium #1 was added to the flask. The flasks containing approximately 100 ml. were agitated and individual flasks removed after 12, 24, 48 and 72 hours' incubation and extracted with chloroform. The extracts were spotted on paper strips and developed with the solvent system, benzene/formamide using the Zaffaroni technique reported in Science III, 6 (1950). A U. V. absorbing tetrazolium reducing product was formed having the same rate of mobility as 4-pregnene-11β,21-diol-3,20-dione. A band of the oxidation product was eluted from the paper and the U. V. spectrum of its fulfuric acid chromogen obtained. It was found to be identical with that of 4-pregnene-11β,21-diol-3,20-dione.

Example 2

Six samples of approximately 50 ml. each of a culture medium having the composition of medium #1 were sterilized for 20 minutes at 120° C. in 250 ml. flasks. Each medium was then inoculated with approximately five milliliters of vegetative growth of culture Wojnowicia graminis (NRRL 2472). The inoculated mixtures were then agitated using a rotary shaker at an agitation speed of 220 R. P. M. for approximately 48 hours, while maintaining the temperature at 28° C. A sterile solution of 10 mg. of 4-pregnene-3,20-dione in 2.5 ml. of propylene glycol was added to each flask and the agitation continued at the same rate for approximately 48 hours. At this point 50 ml. of a 3 day old vegetative growth of culture Curvularia lunata (NRRL 2434) in medium #1 was added to each flask. The flasks containing approximately 100 ml. were agitated and individual flasks were removed after 6, 12, 24, 48, 72 and 96 hours' incubation and extracted with chloroform. The extracts were spotted on paper strips and developed with the solvent system benzene/formamide. A U. V. absorbing-tetrazolium reducing product was found having the same mobility as 4-pregnene-11β,21-diol-3,20-dione.

Example 3

Six samples of approximately 50 ml. each of a culture medium having the composition of medium #1 were sterilized for 20 minutes at 120° C. in 250 ml. flasks. Each medium was then inoculated with approximately five milliliters of vegetative growth of culture Curvularia lunata (NRRL 2434). The inoculated mixtures were then agitated using a rotary shaker at an agitation speed of 220 R. P. M. for approximately 48 hours while maintaining the temperature at 28° C. A sterile solution of 10 mg. of 4-pregnene-17α-ol-3,20-dione in 2.5 ml. of propylene glycol was added to each flask and the agitation continued at the same rate for 24 hours. At this point 50 ml. of a 3 day old vegetative growth of Wojnowicia graminis (NRRL 2472) in medium #1 was added to each flask. The flasks containing approximately 100 ml. were agitated and individual flasks were removed after 6, 12, 24, 48, 72 and 96 hours of incubation and extracted with chloroform. The extracts were spotted on paper and developed in the system chloroform/formamide: methanol. A conversion product which was U. V. absorbing and tetrazolium reducing was observed opposite 4-pregnene-11β,17α,21-triol-3,20-dione. The U. V. spectrum of the product in concentrated sulfuric acid was compared and found identical to that of 4-pregnene-11β,17α,21-triol-3,20-dione.

Example 4

Five samples of approximately 50 ml. each of a culture having the composition of medium #1 were sterilized for 20 minutes at 120° C. in 250 ml. flasks. Each medium was then inoculated with approximately five milliliters of vegetative growth of culture Wojnowicia graminis (NRRL 2472). The inoculated mixtures were then agitated using a rotary shaker at an agitation speed of 220 R. P. M. for approximately 48 hours while maintaining the temperature at 28° C. A sterile solution of 10 mg. of 4-pregnene-3,20-dione in 2.5 ml. of propylene glycol was added to each flask and the agitation continued at the same rate for 48 hours. At this point 50 ml. of a 3 day old vegetative growth of culture Trichoderma viride (NRRL 2473) in medium #1 was added to each flask. The flasks containing approximately 100 ml. were again agitated at the same rate and temperature for 72 hours. At the end of this period 50 ml. of a 3 day old vegetative growth of culture Curvularia lunata (NRRL 2434) in medium #1 was added to each flask. The flasks now containing approximately 150 ml. were agitated and individual flasks were removed after 6, 12, 24, 48 and 72 hours of incubation and extracted with chloroform. The extracts were spotted on paper and developed in the system chloroform/formamide:methanol. A. U. V. absorbing tetrazobolium reducing oxidation product was observed whose $R_f$ and sulfuric U. V. spectrum were identical with 4-pregnene-11β,17α,21-triol-3,20-dione.

Any departure from the above description which conforms to the present invention is intended to be included within the scope of the claims.

What is claimed is:

1. A process for producing 11β,17α,21-trihydroxy steroid, which comprises subjecting a 11,17,21-desoxy steroid selected from the group consisting of pregnenes, pregnanes, and allopregnanes to the action of oxygenating strains of one microorganism selected from each of the genera Spondylocladium, Wojnowicia, and Trichoderma, which will introduce hydroxyl groups at the 11β, 17α, and 21 positions respectively of the steroid molecule, the oxygenation by at least one of the microorganisms being carried out in the presence of at least one other microorganism.

2. A process for producing an 11β,17α,21-trihydroxy steroid which comprises subjecting an 11,17,21-desoxy steroid selected from the group consisting of pregnenes, pregnanes, and allopregnanes under aerobic conditions to the action of oxygenating strains of each of the species Wojnowicia graminis (NRRL 2472), Trichoderma viride (NRRL 2473), and Curvularia lunata (NRRL 2434), which will introduce hydroxyl groups at the 11β, 17α, and 21 positions respectively of the steroid molecule, the oxygenation by at least one of the microorganisms being carried out in the presence of at least one other microorganism.

3. A process for producing a 11β,21-dihydroxy steroid which comprises subjecting a 11,21-desoxy steroid selected from the group consisting of pregnenes, pregnanes, and allopregnanes under aerobic conditions to the action of oxygenating strains of one microorganism selected from each of the genera Spondylocladium and Wojnowicia to produce the corresponding 11β,21-dihydroxy steroid, the oxygenation by at least one of the microorganisms being carried out in the presence of the other microorganism.

4. A process for producing an 11β,21-dihydroxy steroid of the group consisting of pregnenes, pregnanes, and allopregnanes, which comprises subjecting an 11β,21-desoxy steroid selected from the group consisting of pregnenes, pregnanes, and allopregnanes under aerobic conditions simultaneously to the action of oxygenating strains of microorganisms of the species Wojnowicia graminis (NRRL 2472) and Curvularia lunata (NRRL 2434) to produce the corresponding 11β,21-dihydroxy steroid.

5. The process of claim 4, in which the starting steroid is a 4-pregnene-3,20-dione.

6. The process of claim 4, in which the starting steroid is 4-pregnene-17α-ol-3,20-dione.

7. A process for producing an 11β,17α,21-trihydroxy steroid of the group consisting of pregnenes, pregnanes, and allopregnanes which comprises subjecting an 11,17,21-desoxy steroid selected from the group consisting of pregnenes, pregnanes, and allopregnanes under aerobic conditions simultaneously to the action of oxygenating strains of microorganisms of the species *Wojnowicia graminis* (NRRL 2472), *Trichoderma viride* (NRRL 2473), and *Curvularia lunata* (NRRL 2434) to produce the corresponding 11β,17α,21-trihydroxy steroid.

8. The process of claim 6 in which the starting steroid is 4-pregnene-3,20-dione.

References Cited in the file of this patent

UNITED STATES PATENTS

| | | |
|---|---|---|
| 2,602,769 | Murray | July 8, 1952 |
| 2,649,401 | Haines | Aug. 18, 1953 |

OTHER REFERENCES

Bessey: Morphology and Taxonomy of Fungi, The Blakiston Co., Phila., 1950, pp. 15–19.